Aug. 27, 1968  K. J. KNUDSEN  3,399,293
ALTERNATING CURRENT ELECTRIC POWER CONTROL
Filed April 2, 1965  2 Sheets-Sheet 1

INVENTOR.
Knud J. Knudsen
BY
AGENT

INVENTOR.
Knud J. Knudsen

United States Patent Office 3,399,293
Patented Aug. 27, 1968

3,399,293
ALTERNATING CURRENT ELECTRIC
POWER CONTROL
Knud J. Knudsen, Daytona Beach., Fla., assignor to Lewis
Engineering Company, Naugatuck, Conn., a corporation of Connecticut
Filed Apr. 2, 1965, Ser. No. 445,059
7 Claims. (Cl. 219—501)

ABSTRACT OF THE DISCLOSURE

An automatic electric power control wherein an electric heater has a power circuit connected to it, with a power rectifier in the circuit and an SCR shunted across the power rectifier to conduct in an opposite direction. There is a control element which is responsive to heat from the heater, connected to the gate of the SCR for the purpose of providing an automatically varying controlled bias voltage on the gate, thereby to effect a substantially constant average power in the heater.

---

This invention relates to the automatic control of electrical power, and more particularly to a heat-responsive apparatus for automatically controlling the temperature of an instrumentality which is heated electrically by alternating current.

The invention concerns improvements in the electric power control device which is disclosed and claimed in my Patent No. 3,116,396 dated Dec. 31, 1963 and entitled "Electric Temperature Control." The present invention constitutes another species of the invention which is disclosed and claimed in my application Ser. No. 431,040 filed Feb. 8, 1965, and entitled, "Alternating Current Power Control."

An object of the invention is to provide a novel and improved alternating current power control device which does not require heavy duty power transformers in effecting the control, but which utilizes heavy-current rectifiers and gated or controlled rectifiers in an especially simple, heavy-duty power circuit.

Another object of the invention is to provide an improved power control in accordance with the foregoing, which is especially accurate and reliable in maintaining, by means of a photo-sensitive control element and an incandescent light source associated therewith, a given condition, as for example a substantially constant average power in a heater or a constant temperature of an electrically heated bath or liquid-containing vessel.

Still another object of the invention is to provide an improved alternating current power control as above set forth, wherein only relatively inexpensive components which are readily available, are required, and wherein relatively few such components involved in a simplified circuit effect the desired sensitive and accurate control.

A feature of the invention resides in the provision of an improved A.C. power control characterized as above, wherein an appreciable amount of power in the four to eight kilowatt range, and even greater amounts of power may be safely handled, such power being readily switched by small values of control voltage and current in a contactless circuit.

Other features of the invention involve the provision of an improved A.C. electric power control apparatus having the listed advantages, which control is relatively small and compact, light in weight, especially simple, sturdy and foolproof in its operation, and wherein the magnitude of the power being handled is not a factor affecting the useful service life of the equipment.

A still further object of the invention is to provide an alternating current power control apparatus in accordance with the foregoing, wherein but a single control photo-electric cell is utilized, providing a plurality of automatically varied bias or control voltages which are employed to effect a control over a plurality of controlled rectifier assemblages, and wherein simple and inexpensive transformer-type power supplies are utilized in conjunction with the single photo-electric cell, to produce the automatically varied bias voltages.

Other features and advantages will hereinafter appear.

In the accompanying drawings, illustrating several embodiments of the invention:

Figure 1:
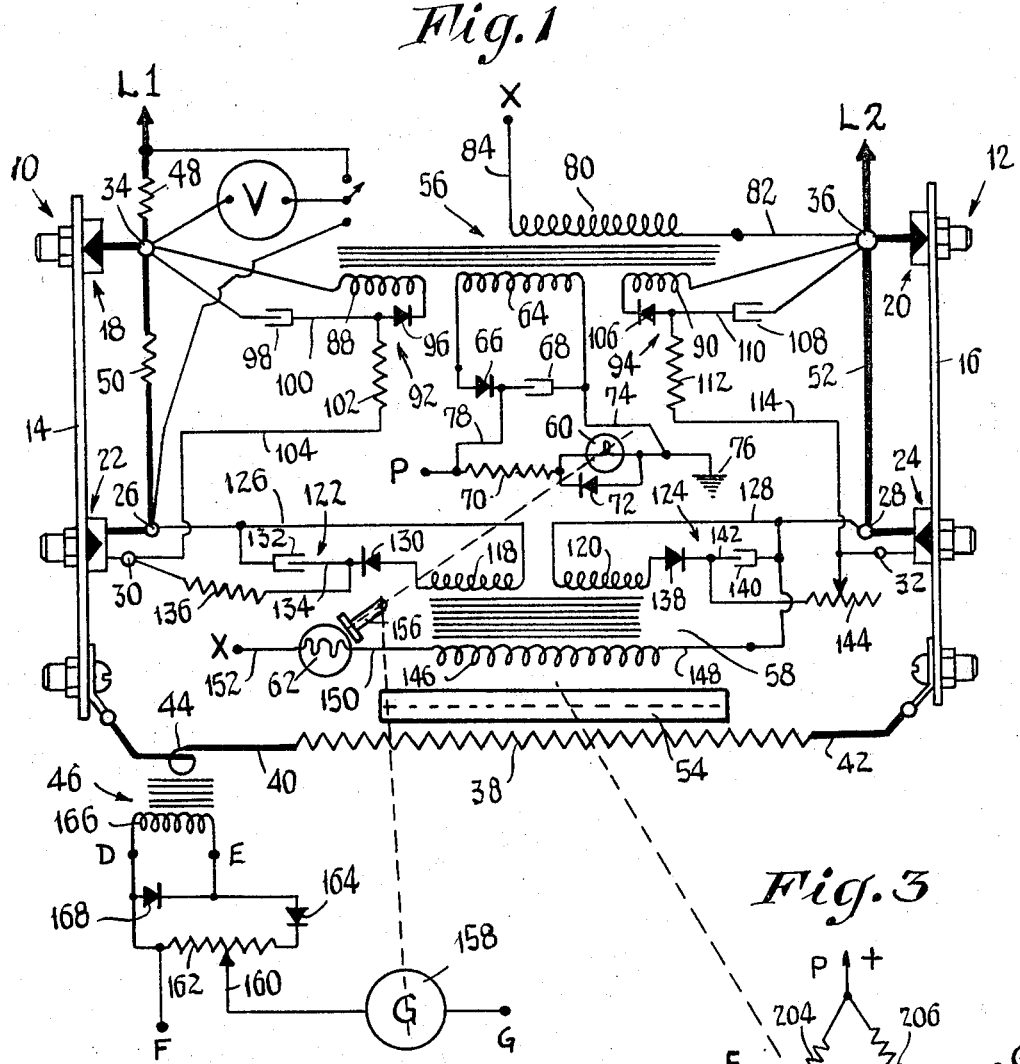
FIG. 1 is a schematic circuit diagram of an improved and simplified single-phase automatic A.C. electric power control apparatus as provided by the invention.

Referring to FIG. 1, the main power lines are indicated by the terminals L1 and L2. Associated with the power lines L1 and L2 are rectifier assemblages 10 and 12, these assemblages comprising heat sinks 14, 16 respectively on which are mounted rectifier elements 18, 20 and controlled rectifier elements 22, 24. The rectifier elements 22, 24 are indicated as being Silicon Controlled Rectifiers or SCR's. Although the rectifiers 18, 20, 22 and 24 are preferably of the silicon type, it will be understood that other rectifiers, diodes, vacuum tube devices and the like which are of an equivalent nature, may be utilized. The SCR's 22, 24 are shown as having base terminals 26, 28 and gate terminals 30, 32 respectively.

The cathodes of the SCR's 22, 24 are electrically connected to the heat sinks 14, 16 which latter may be of suitable aluminum or copper strip or plate construction. Also, the rectifiers 18, 20 are indicated as having cathode terminals 34, 36 and as having their bases electrically connected to the heat sinks 14, 16.

Also, a load or heater element 38 is shown, having connecting wires 40, 42 which are respectively connected to the heat sinks 14, 16, the wire 40 including one or several heavy turns 44 constituting the primary of an anticipator transformer 46 whose functioning will be described later in detail.

The line L1 is connected through a heavy low-value resistor 48 with the cathode terminal 34 of the rectifier 18, and such terminal is connected by a similar heavy, low-value resistor 50 to the base terminal 26 of the SCR 22. The power line L2 is connected to the cathode terminal 36 of the rectifier 20, and such terminal is connected by a wire 52 to the base terminal 28 of the SCR 24.

The above connections complete the power circuit through the heater 38, and it will be noted that the SCR's are bridged or shunted by the rectifiers in such a manner that the latter will conduct current in an opposite direction to the SCR's. With this arrangement, no current will flow through the heater 38 when the SCR's are not conducting, as by the presence of a negative bias voltage on the gates 30, 32 of the SCR's. However, when the bias on the gates 30, 32 is made positive, the SCR's 22, 24 will be rendered conducting, and both the negative and the positive halves of the alternating current wave will flow through the heater 38, such energy being converted to heat which may be utilized, for example, to raise the temperature of a liquid bath 54.

In conjunction with the above power circuit, the invention provides means connected to the gates 30, 32 of the SCR's and including an element which is responsive to heat from the heater 38, for the purpose of providing an automatically varying controlled bias voltage on said gates thereby to effect a substantially average constant power in the heater 38 or to effect a uniform temperature of the heater bath 54.

The said means as shown in FIG. 1 comprises a bias and bridge supply transformer 56 and a signal transformer 58, both transformers being of relatively small size and power. The bias transformer 56 also supplies energy for an incandescent lamp 60, which is utilized to activate a photo-electric cell 62 in a manner to be described later.

Energization of the lamp 60 is effected by a secondary winding 64 connected to a rectifier 66 and capacitor 68. The lamp 60 and a series resistor 70 are connected across the capacitor 68, and a voltage limiting element or Zener diode 72 bridges the lamp 60 to provide protection against burn-out. One terminal of the capacitor 68 is connected by a wire 74 to a ground 76, and the other terminal of the capacitor 68 is connected to a positive power supply lead labelled P, by means of a wire 78.

The transformer 56 has a primary winding 80 connected by a wire 82 to the power line L2, and connected by a wire 84 to a neutral terminal X, by which 115 volts energization of the primary 80 is effected. It will be understood that the power lines L1 and L2 may have a potential of 220–240 volts.

The bias transformer 56 has secondary windings 88, 90 connected respectively to the terminals 34, 36 and also bridged by series-connected rectifier-capacitor assemblages 92, 94. The assemblage 92 comprises a rectifier 96 and capacitor 98 joined by a wire 100 which is connected with a resistor 102 in turn connected by a wire 104 to the gate 30 of the SCR 22. The assemblage 94 comprises a rectifier 106 and capacitor 108 joined by a wire 110, such wire being connected to a resistor 112 which is in turn connected by a wire 114 to the gate 32 of the SCR 24. The arrangement of the secondary circuit 88, 90 is such that there is normally applied to the gates 30, 32 a negative bias voltage of approximately −5.

Modifying the normally negative bias voltage thus provided by the transformer 56 is a positive signal voltage from the signal transformer 58. The transformer 58 has secondary coils 118, 120 which are bridged respectively by rectifier-capacitor assemblages 122, 124 and are connected by wires 126, 128 to the base terminals 26, 28 of the SCR's 22, 24 respectively. The assemblage 122 comprises a rectifier 130 and capacitor 132 joined by a wire 134 which is connected through a resistor 136 with the gate 30. The assemblage 124 comprises a rectifier 138 and capacitor 140 joined by a wire 142 which is connected through a variable resistor 144 to the gate 32. With such arrangement, energization of the signal transformer 58 will result in positive potentials being applied through the resistors 136, 144 to the gates 30, 32 respectively, and the values of the resistors applying such positive potentials, as well as of the resistors 102, 112 and the value of the positive potentials from the signal transformer 58 are all such that the normally present −5 volts negative bias on the gates 30, 32 will be replaced by a positive bias voltage of low value, normally slightly below +5 volts.

The energization of the signal transformer 58 is effected by controlling current supplied to the primary winding 146 in response to the heating and cooling of the bath 54. The primary 146 is connected by a wire 148 through the wire 52 to the line L2, and connected by a wire 150 to the conductive-type photo-electric cell 52 which is in turn connected by a wire 152 to the terminal X, representing the neutral supply which is common with the bias transformer primary 80.

When the photo-cell 62 is not conducting, no current will flow through the primary 146 and no positive bias will be established on the gates 30, 32. However, whenever the photo-electric cell 62 is rendered conducting, the resultant current in the transformer primary 146 will cause a positive bias to be established on the gates 30, 32, rendering the SCR's 22, 24 conducting and resulting in energization of the electric heater 38.

Control of the illumination of the photo-cell 62 is effected by a shutter 156 which is mechanically coupled to or carried by a galvanometer or D'Arsonval movement 158, the shutter 156 being adapted to interrupt a light beam from the lamp 60 to the photocell 62.

The galvanometer 158 is electrically connected to the arm 160 of a resistor 162 which is in series with a rectifier 164 and a secondary coil 166 of the anticipator transformer 46. Across the secondary coil is a second rectifier 168, which prevents any appreciable voltage from existing across the resistor 162 and rectifier 164. For half cycles of the wave, no effect is produced on the galvanometer 118 this being due to the presence of the rectifier 168. The short-circuiting of the winding 166 by the rectifier 168 is not such as to cause excessive heat or damage to the winding, since the current is limited by the load 38.

The secondary coil 166 of the anticipator transformer 46 is shown as having terminals D and E. A terminal F is connected to one end of the resistor 162, and a terminal G is connected to the remaining lead from the galvanometer 158.

Figure 2:
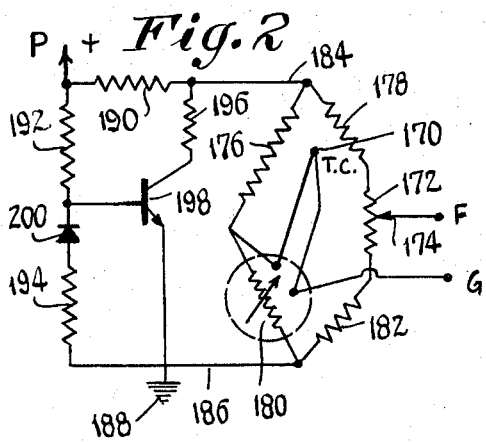
FIG. 2 is a schematic diagram of a bridge circuit for use with the apparatus of FIG. 1.

In FIG. 2 a pyrometer bridge circuit is illustrated, having a thermocouple 170 with one wire connected to a terminal G, which is to be connected to the correspondingly lettered terminal in FIG. 1. The thermocouple 170 is made to be responsive to the temperature of the bath 54, as will be readily understood. The bridge contains a resistor 172 having an adjustable arm 174 connected to a terminal F, which is intended for connection to the correspondingly lettered terminal of FIG. 1.

The bridge of FIG. 2 includes resistive legs 176, 178, 180 and 182 connected as shown, and energization of the bridge is effected through wires 184 and 186, the latter being joined to a ground 188. The wire 184 is connected through a resistor 190 to a supply terminal P, which is intended for connection with the correspondingly lettered terminal of FIG. 1, providing a positive potential.

A voltage regulator network comprising resistors 192, 194 and 196, a transistor 198 and a diode 200 is provided, to closely regulate the voltage applied to the bridge circuit in FIG. 2 as received from the terminal P. Such voltage regulator and bridge circuit are disclosed and described in detail in my patent No. 3,004,209 dated Oct. 10, 1961, and entitled "D.C. Regulator and Control Circuit." Further details may be had from this identified patent, and accordingly are not given herein.

Figure 3:
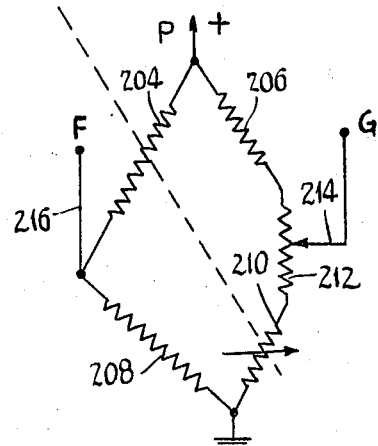
FIG. 3 is a schematic diagram of another type of bridge circuit which is an alternative to that shown in FIG. 2, for use with the control apparatus of FIG. 1.

In FIG. 3 another type of bridge is illustrated, comprising resistive legs 204, 206, 208 and 210, the latter comprising a resistance thermometer bulb which is responsive to the temperature of the bath 54 as indicated by the broken line connection. The bridge of FIG. 3 includes a resistor 212 having a slider 214 connected to the terminal G. The common connection between the legs 204 and 208 is connected to the terminal F by a wire 216. The terminals F and G in FIG. 3 are intended for connection to the correspondingly lettered terminals of FIG. 1, in place of the bridge circuit of FIG. 2.

The operation of the improved control apparatus may now be readily understood. At the time that the heater 38 is cold, the bridge circuit of FIG. 2 (or that of FIG. 3) will deflect the galvanometer 158 so as to shift the shutter 156 out of the path of the light beam from the lamp 60 to the photo-cell 62. Illumination of the photo-cell 62 will energize the signal transformer 58, resulting in positive bias voltages somewhat under +5 volts being established on the gates 30, 32 of the SCR's 22, 24. The positive bias voltages thus established will render the SCR's conducting, and the heater 38 will be energized from the lines L1 and L2. As the heater raises the temperature of the bath 54, the corresponding effect on the sensing element 170 (or 210 of FIG. 3) will result in deflection of the galvanometer so as to gradually bring the shutter 156 in line with the light beam, shutting off the light from the photo-cell 62. This will result in de-energization of the signal transformer 58, and will gradually reduce the positive bias applied to the gates 30, 32. When the temperature of the bath 54 is sufficiently high, a complete shut-off of the light from the photo-cell 62 will occur, and a normal negative bias will be re-established on the gates 30, 32, resulting in de-energization of the heater 38. This action will reverse and repeat as the bath 54 cools and heats. Thus, an automatic control of the energization of the heater 38 is effected, whereby the temperature of the bath 54 will be closely maintained.

Adjustment for the desired temperature is effected by altering the setting of the resistor 144. The millivoltmeter V gives an indication of the relative currents of the rectifiers.

It will be seen that the present improved circuit does not require heavy or cumbersome power transformers, but instead the heavy heating current merely passes through the rectifier and SCR devices carried by the heat sinks 14, 16. The signal and bias transformers may be relatively small and compact, and the various components and elements of the circuit are seen to be such that the apparatus may be relatively small, compact and light in weight. No make and break contacts are involved, and the operation in such that a long useful and trouble-free life will be had.

The operation of the anticipator device comprising the transformer 46 is such that the current condition in the heater 38 will tend to augment or exaggerate the movement of the galvanometer 158, thereby increasing the action which tends to correct the deviations from the desired temperature of the bath 54. That is, when the bath is cooling, the action of the anticipator transformer 46 and associated circuit will be such as to cause a slightly greater current to flow due to the greater deflection of the galvanometer 158, and vice versa.

A detailed explanation of such anticipator circuit is given in my copending application Ser. No. 431,040 referred to above. Accordingly, no further explanation is given herein since the details of the anticipator form no part of the present invention per se.

Suggested values for some of the circuit components are as follows:

Resistors 102 and 112—2700 ohms.
Resistor 136—270 ohms.
Resistor 144—500 ohms.
Resistors 48 and 50—.005 ohm.
Capacitors 98, 108, 132 and 140—25 mfd.
Diode 72—4.7 volt Zener.
Rectifiers 18 and 20—type 1N1196H.
SCR's 22 and 24—type 2N688.
Voltage of secondaries 118 and 120—13 volts.
Voltages of secondaries 88 and 90—2 volts.

Figure 4:
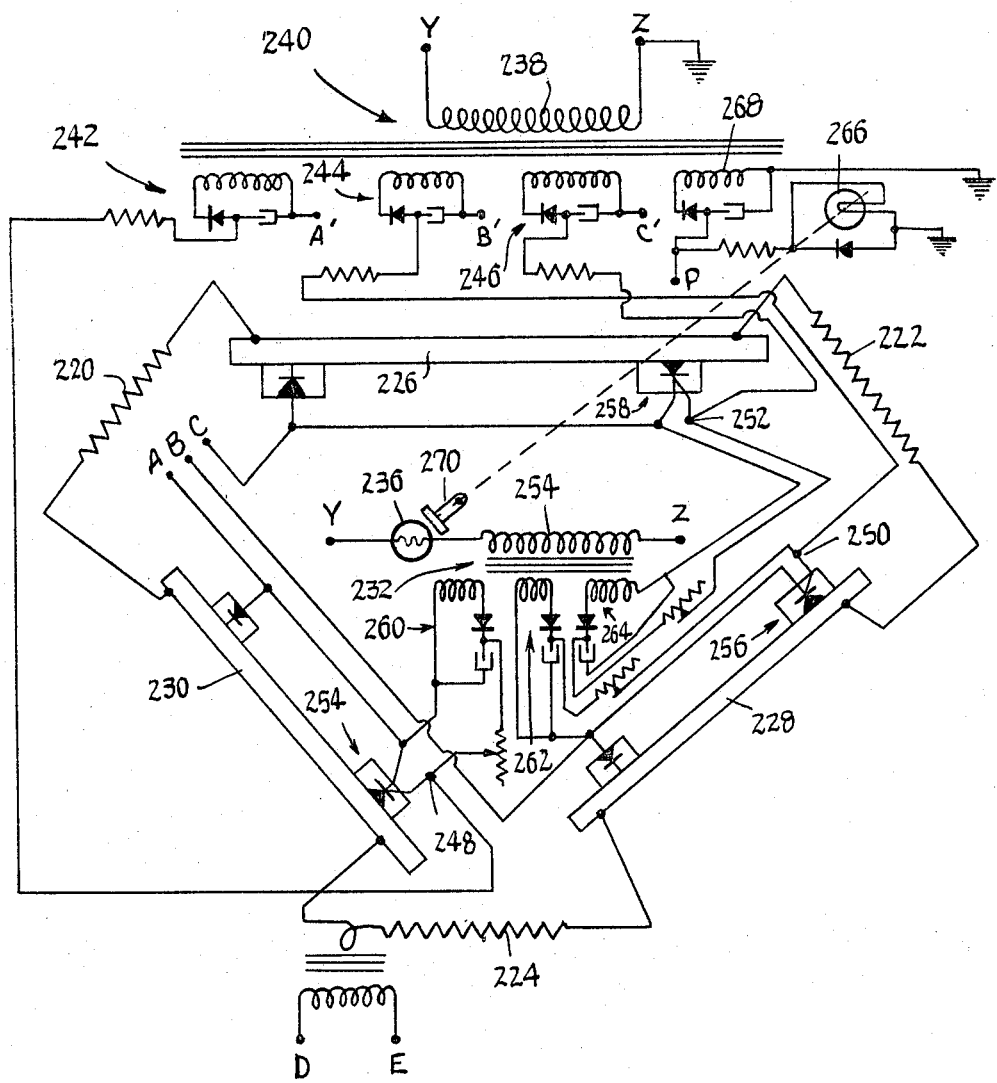
FIG. 4 is a schematic circuit diagram of a three-phase automatic power control apparatus embodying the invention.

Another embodiment of the invention is illustrated in FIG. 4, showing a control adapted for heater energization from a three-phase, three-wire power supply. In FIG. 4, the three-phase supply terminals are indicated A, B and C. Three heaters 220, 222 and 224 are connected respectively to heat sinks 226, 228 and 230, such heat sinks carrying rectifier and SCR units similar to those described in connection with FIG. 1.

A signal transformer 232 has a primary 234 connected with a photo-cell 236, the terminals Y and Z of the transformer 232 being connected to a 115 volt supply, which also is used to energize the primary coil 238 of a bias and lamp energizing transformer 240. Secondary and rectifier-resistor units 242, 244 and 246 of the transformer 240 provide a normal negative bias voltages to gate terminals 248, 250 and 252 of the SCR's 254, 256 and 258.

The signal transformer 232 has secondary signal windings and rectifier assemblages 260, 262 and 264 by which positive signal voltages are impressed on the gates 248, 250, 252 when energization of the heaters 220, 222 and 224 is to occur due to their cooling. Lighting of the photo-cell 236 occurs with light from the lamp 266, energized from the transformer secondary winding 268.

The operation of the control, involving the lamp 266, shutter 270 and photo-cell 236 together with the bias and signal transformers is essentially similar to that already described in detail in connection with FIGS. 1–3. Further explanation is considered unnecessary in view of the similarity of the circuits, except for the single phase and three-phase difference. Three-phase power is supplied to the terminals A, B and C, whereas single phase power is supplied to the terminals Y and Z. The terminals D and E in FIG. 4 are intended for connection with the correspondingly lettered terminals D and E of the galvanometer and anticipator arrangement of FIG. 1, which arrangement is to be connected to one of the bridge circuits of FIGS. 2 and 3 as will be understood. The terminals A', B' and C' are bias voltage returns, intended for connection to the power terminals A, B and C respectively.

The advantages of the embodiment of FIGS. 1 and 3 are also had with the embodiment of FIG. 4.

Variations and modifications may be made within the scope of the claims, and portions of the improvement may be used without others.

I claim:
1. An automatic electric power control comprising, in combination:
 (a) an electric heater,
 (b) a power circuit connected to the heater,
 (c) a power rectifier in said circuit,
 (d) an SCR shunted across the power rectifier to conduct in an opposite direction, and
 (e) means connected to the gate of the SCR and including an element responsive to heat from the heater, providing an automatically varying controlled bias voltage on said gate to effect a substantially constant average power in the heater.

2. An automatic electric power control as in claim 1, wherein:
 (a) a second power rectifier and shunted SCR are connected in the power circuit in opposition respectively to the first rectifier and SCR,
 (b) said means providing a similar bias voltage on the gate of the second SCR.

3. An automatic electric power control comprising, in combination:
 (a) an electric heater,
 (b) a power circuit connected to the heater,
 (c) a power rectifier in said circuit,
 (d) an SCR shunted across the power rectifier to conduct in an opposite direction, and
 (e) means connected to the gate of the SCR and including an element responsive to heat from the heater, providing an automatically varying controlled bias voltage on said gate to effect a substantially constant average power in the heater,
 (f) a second power rectifier and shunted SCR connected in the power circuit in opposition respectively to the first rectifier and SCR,
 (g) said means providing a similar bias voltage on the gate of the second SCR,
 (h) the said means comprising a transformer-type power supply having a primary winding and a conductive-type photocell in series with said winding, and further comprising:
  (1) a light source, and
  (2) a light control device for varying the light striking the photocell from said source,
  (3) said light control device being operated in response to heating and cooling of the heater.

4. An automatic electric power control as in claim 3, wherein:
 (a) the said power supply comprises a pair of transformer secondary windings and rectifiers for converting the secondary voltages to D.C., (b) resistors connected with said rectifiers and the said gates,
(c) an additional pair of transformer secondary windings and rectifiers for converting the secondary voltages thereof to D.C., and
(d) resistors connected with the second-mentioned rectifiers and the said gates,
(e) said transformer primary winding being associated with said first-mentioned pair of secondary windings.

5. An automatic electric power control as in claim 4, wherein:
(a) the first-mentioned rectifier and SCR are carried by a common heat sink,
(b) said second-mentioned rectifier and SCR being carried by a common heat sink separate from the first heat sink.

6. An automatic electric power control comprising, in combination:
(a) an electric heater,
(b) a power circuit connected to the heater,
(c) a power rectifier in said circuit,
(d) an SCR shunted across the power rectifier to conduct in an opposite direction, and
(e) means connected to the gate of the SCR and including an element responsive to heat from the heater, providing an automatically varying controlled bias voltage on said gate to effect a substantially constant average power in the heater,
(f) a second power rectifier and shunted SCR connected in the power circuit in opposition respectively to the first rectifier and SCR,
(g) said means providing a similar bias voltage on the gate of the second SCR,
(h) two additional electric heaters connected to receive 3-phase power,
(i) said power circuit comprising a 3-wire, 3-phase system, and
(j) a third power rectifier and shunted SCR connected in the power circuit to conduct in opposite directions respectively to the first and second rectifiers and SCR's.

7. An automatic electric power control as in claim 6, wherein:
(a) the said means comprises a transformer-type power supply having a primary winding and a conductive-type photocell in series with said winding, and further comprises:
 (1) a light source, and
 (2) a light control device for varying the light striking the photocell from said source,
 (3) said light control device being operated in response to heating and cooling of the heaters.

References Cited

UNITED STATES PATENTS

| | | | |
|---|---|---|---|
| 2,761,052 | 8/1956 | Knudsen | 219—499 |
| 3,097,314 | 7/1963 | Harriman | 219—501 X |
| 3,116,396 | 12/1963 | Knudsen | 219—502 |
| 3,159,737 | 12/1964 | Dora | 219—501 |
| 3,176,158 | 3/1965 | Guignard | 307—88.5 |
| 3,218,511 | 11/1965 | Rosenbaum | 315—196 X |

RICHARD M. WOOD, *Primary Examiner.*

L. H. BENDER, *Assistant Examiner.*